United States Patent [19]
Shirakawa et al.

[11] Patent Number: 5,121,351
[45] Date of Patent: Jun. 9, 1992

[54] FLOATING POINT ARITHMETIC SYSTEM

[75] Inventors: Tomonori Shirakawa; Tsutomu Hoshino, both of Tsukuba, Japan

[73] Assignee: The University of Tsukuba, Ibaraki, Japan

[21] Appl. No.: 666,429

[22] Filed: Mar. 11, 1991

Related U.S. Application Data

[63] Continuation of Ser. No. 363,902, filed as PCT/JP88/00295, Mar. 18, 1988, abandoned.

[30] Foreign Application Priority Data

Sep. 17, 1987 [JP] Japan .................. 62-231093

[51] Int. Cl.⁵ .................. G06F 7/38
[52] U.S. Cl. .................. 364/748
[58] Field of Search ........ 364/736, 748, 200 MS File, 364/900 MS File

[56] References Cited

U.S. PATENT DOCUMENTS

| | | | |
|---|---|---|---|
| 4,589,067 | 5/1986 | Porter et al. | 364/748 X |
| 4,612,628 | 9/1986 | Beauchamp et al. | 364/748 |
| 4,763,294 | 8/1988 | Fong | 364/748 |
| 4,773,035 | 9/1988 | Lee et al. | 364/748 |
| 4,800,516 | 1/1989 | Si et al. | 364/748 |
| 4,823,260 | 4/1989 | Imel et al. | 364/748 X |

FOREIGN PATENT DOCUMENTS 56-4862  1/1981  Japan .
5498548  3/1989  Japan .

Primary Examiner—Tan V. Mai
Attorney, Agent, or Firm—Sughrue, Mion, Zinn, Macpeak & Seas

[57] ABSTRACT

A floating point arithmetic system including an operating processor for effecting the floating point operation, a memory device for storing data to be operated and a processing device for controlling the data transfer between the operating processor and the memory device and the operating process to be executed, wherein the processing device, memory device and operating processor are mutually connected by means of an address control bus line, and the processing device and memory device are connected to each other by means of a data bus line. In the processing device, there is generated an instruction signal which includes an address code representing an address of data to be operated and an instruction code denoting the content of operation to be executed, and the instruction signal is supplied to the memory device and operating processor via the address control bus line. In response to this instruction signal, the memory device transfers the data to be operated to the operating processor and the operating processor executes the operation for the transferred data. In this manner, the data transfer and operating process can be effected substantially simultaneously by a single access.

6 Claims, 3 Drawing Sheets

| 31 | 30 29 ~ 23 | 22 21 20 ~ 01 00 |
|---|---|---|
| 1 | Instruction for FPU | Memory Address |

FLOATING POINT ARITHMETIC SYSTEM

This is a continuation of application Ser. No. 07/363,902 filed as PCT/JP88/00295, Mar. 18, 1988, now abandoned.

TECHNICAL FIELD

The present invention relates to a floating point arithmetic system comprising a floating point operating processor (hereinafter referred to (FPU)), and more particularly a floating point arithmetic system by means of which the so-called scalar operation and vector operation can be executed efficiently at a high speed.

TECHNICAL BACKGROUND

The operation system with a floating point has been widely used in the work station for effecting scientific calculation and image processing, because this system has a wider dynamic range and a higher precision than the regular number arithmetic system. The FPU for use in the floating point arithmetic system is constituted by FPU which is called a co-processor having an interface with a given microprocessor for general use or by FPU which does not comprise an interface with respect to the microprocessor. The former FPU can be easily coupled with the microprocessor, but the operation speed is rather low in connection with the processing speed of the microprocessor. The latter FPU can operate at a speed higher than the former FPU by several tens times, so that its usability in the computer system of high operation speed is very high.

In case of using the high speed FPU, it is important how to construct the interface for connecting the FPU to the microprocessor serving as the host computer. For instance, the host computer, memory and FPU are connected to each other by providing address bus, data bus and bus-buffer for control line. The data transfer between the host computer and FPU is effected by means of the data bus of the host computer, and the data before the processing is loaded in RAM of FPU from memories of respective computers. The computers send commands for effecting the operation algorithm to FPU, and then the operation is initiated. After FPU has completed a single algorithm program, the host computer reads the result of operation out of an output RAM of FPU.

In the known operating system, the operation speed of the system is limited by the overhead time such as memory access due to the fact that the control instruction of the data transfer from the memory to FPU and the operating instruction are effected by the microcomputer, and therefore the high speed operation of FPU could not be sufficiently utilized. For instance, in case of executing the operation A=B+C, the following processes are required.

① transfer of data B (memory→CPU→FPU)
② transfer of data C (memory→CPU→FPU)
③ transfer of operating instruction
④ operation
⑤ transfer of operation result A (FPU43 CPU→ memory)

In case of effecting this operation, the overhead time amounts to about 4 μs, while the operation time itself is only 0.2 μs, so that the high speed operation of FPU is not optimally utilized. Particularly, in case of effecting the vector operation by the repetitive operation with the aid of a loop of variable array, a very long time is required for calculating addresses of variables, so that the high speed processing of FPU could not be utilized efficiently.

DISCLOSURE OF THE INVENTION

The present invention has for its object to provide a floating point arithmetic system in which the transfer and control among the microprocessor, memory and FPU can be effected efficiently and thus the high speed operation of FPU can be utilized optimally.

It is another object of the invention to provide a floating point arithmetic system which can effect the repetitive operation for the data array, i.e. the vector operation efficiently at a high speed.

According to the invention, in order to attain the above mentioned objects, the floating point arithmetic system comprises a floating point operating processor for effecting the floating point operation, a memory device for storing data to be operated, and a processing device for controlling the data transfer between the floating point operating processor and the memory device and the operation process in the floating point operating processor, whereby the floating point operating processor, memory device and processing device are mutually connected to each other by means of an address control bus, the floating point operating processor and memory device are connected to each other by means of a data bus line for effecting the data transfer, an instruction signal which includes an address code representing an address of data to be operated and an instruction code representing a content of operation to be executed by the floating point operating processor is supplied to the floating point operating processor and memory device from said processing device, in response to the instruction signal, the data to be operated is transferred from the memory device to the floating point operating processor by means of the data bus line, in response to said instruction signal the data supplied from the memory device is operated in the floating point operating processor, and the data transfer and operating process are effected substantially simultaneously with the aid of a single access.

In the above mentioned floating point arithmetic system according to the invention, the processing device generates the instruction signal including the address code representing the address of data to be operated and the instruction code representing the executive instruction for FPU, and the instruction signal is supplied to the memory device and FPU. In the memory device, the data denoted by the address code is read out and is supplied to FPU, and in FPU the operation denoted by the instruction code is carried out for the thus transferred data. In this manner, the data transfer and operation can be executed simultaneously by means of a single access, and the data can be transferred directly between the memory device and FPU without being intermediated by CPU, and the floating point calculation can be performed by utilizing the high speed faculty of FPU. In particular, in case of effecting the vector operation in which the repetitive operation is carried out with the aid of the loop of variable array, the direct data transfer is effected between the memory device and FPU, and thus the high speed performance of FPU can be utilized further effectively.

BEST MODE FOR CARRYING OUT THE INVENTION

Figures 1A, 1B:
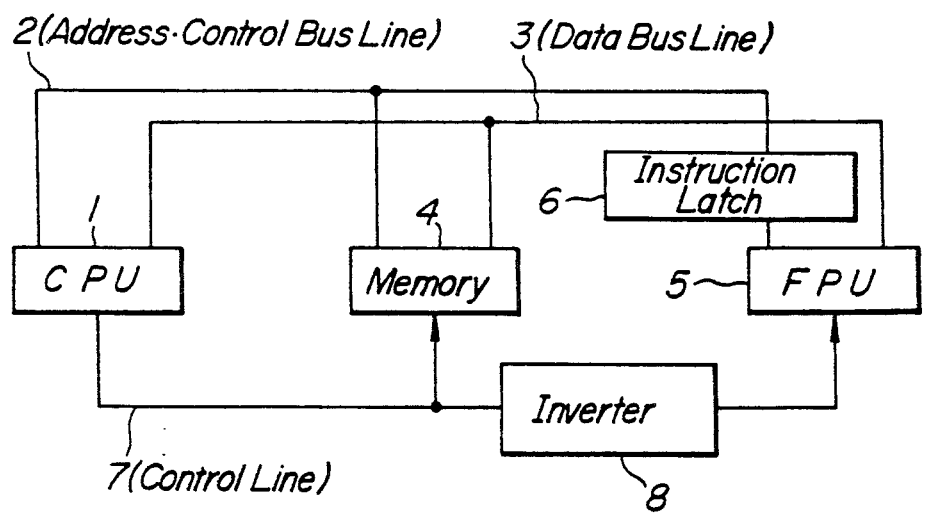
FIGS. 1A and 1B are schematic views showing the construction of the arithmetic system according to the invention for effecting the scalar operation.

FIG. 1 shows an embodiment of the arithmetic system according to the invention for carrying out the scalar operation. FIG. 1A is a block diagram showing the whole construction of the system and FIG. 1B is a schematic view representing an example of the address format of the instruction order. To a central processing unit (CPU) 1 for controlling the operation process are connected an address.control bus line 2 and a data bus line 3 which are further connected to a memory 4 for storing data to be operated and a floating point operating unit (FPU) 5 for carrying out the floating point calculation. Therefore, the CPU 1, memory 4 and FPU 5 are mutually connected to each other. The data bus line 3 functions to effect the data transfer between the memory 4 and FPU 5, and the address control bus line 2 transfers an instruction signal including an address code which represents an address of data to be transferred and an instruction code which denotes the content of process to be executed at FPU from CPU 1 to the memory 4 and FPU 5. It should be noted that the address control bus line 2 is connected to FPU 5 via an instruction latch 6. To CPU 1 is further connected a control line 7 for transmitting a read or write signal, said control line being further connected to the memory 4 and to FPU 5 via an inverter 8. Therefore, when the read signal is supplied from CPU 1 to the memory 4 via the control line 7, the write signal is supplied to FPU 5, and when the write signal is supplied to the memory 4, the read signal is supplied to FPU 5. According to the invention, CPU 1 sends a single instruction signal to the memory 4 and FPU 5 via the address.control bus line, said instruction signal mapping the executive instruction for FPU with an address of the data to be operated. With the aid of this single instruction signal, the memory 4 is ordered to load the data to be operated to the data bus line 3 and the content of process to be executed in FPU 5 is denoted. To this end, as illustrated in FIG. 1B, the instruction signal has the address format of 32 bits. When the most significant thirty first bit A31 is 1, it is denoted that there is the operation order. Bits from thirtieth bit to twenty second bit represent the executive instruction code for FPU, and bits from twenty first bit to the least significant bit represent the address code. Therefore, when the signal having the address format shown in FIG. 1B is generated from CPU 1, the memory 4 reads the data stored at positions represented by the addresses A21~A00 into the data bus line 3, and the write signal is supplied to FPU 5 within the same cycle via the instruction latch, so that the data read out of the memory 4 is written into FPU. In case of writing the result of operation obtained in FPU into the memory, the same address format is generated.

The scalar operation will be performed by the following steps.

① A first instruction signal is transferred from CPU 1 (first memory access), and in response to the first instruction signal, first data to be operated is read out of the memory 4 into the data bus line 3 and at the same time the read out data is written into FPU 5.

② A second instruction signal containing an address of another data to be operated and an operating instruction for FPU is transferred from the CPU 1 (second memory access), and the second data to be operated is read out of the memory 4 and the operating instruction is executed in FPU 5.

③ The operation result is once latched in the output register of FPU and is then transferred to the memory 4. This transfer may be performed by the single access to the memory, but a further memory access may be required in dependence upon FPU to be used. In this case, the single step requires the two memory accesses, but if the transfer instruction of memory to memory is used, this step may be carried out by means of the single instruction. The result of operation is latched in the output register of FPU in response to the first memory access of the memory-memory transfer instruction, and the result of operation is then written into the memory 4 in response to the next memory access. By constructing the system in the manner explained above, the scalar operation can be completed by three to four cycles, so that the system according to the invention can operate at a higher speed than the known floating point arithmetic method by about two times.

Figure 2:
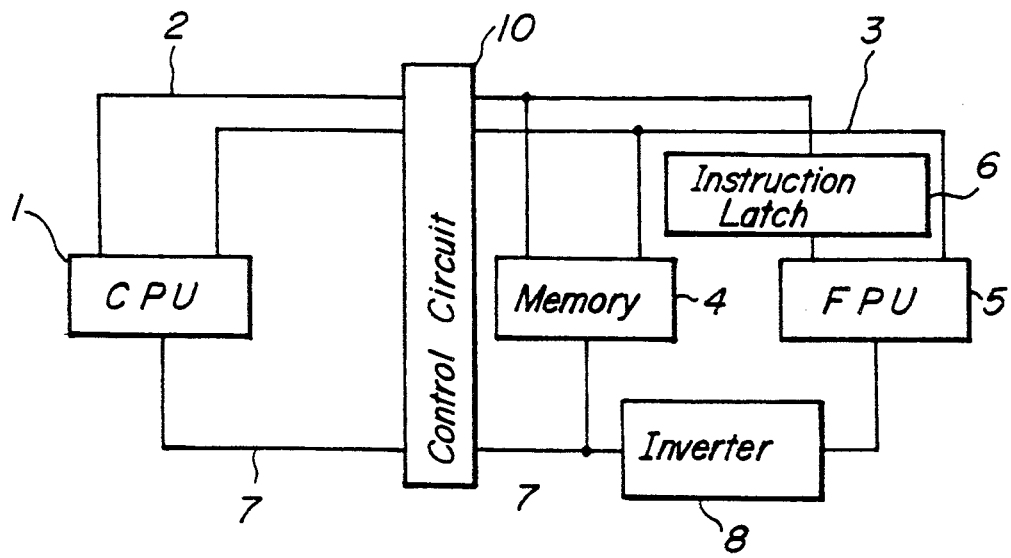
FIG. 2 is a block diagram illustrating the construction of the arithmetic system according to the invention for carrying out the vector operation.

Next, the vector operation in which the repetitive operation is carried out with the aid of the loop of variable array will be explained. FIG. 2 shows an embodiment of the arithmetic system for effecting the vector operation. In the vector operation, the instructions for the scalar operation are successively generated in an automatic manner with the aid of an address generator. In order to initiate the vector operation mechanism, it is first necessary to set initial addresses of respective addresses, increments and last addresses for judging the completion of operation as well as operating instruction for each vectors and operating sequence. To this end, there is provided a control circuit 10 for solely effecting the data transfer at a high speed, and the high speed data transfer between the memory and FPU is performed. For performing the initial set also at a high speed, it is possible to utilize the method similar to that used for the scalar operation, and the operating instruction for FPU and initial addresses for the memory are set by using both the data bus line and address.control bus line.

It should be noted that the instruction for FPU 5 may be mapped with the address for the memory 4, and further ma be transferred directly from the control circuit 10 to FPU 5. If the mapping between the instruction for FPU 5 and the address is effected, the vector operation may be carried out by means of the same address format as that for the above mentioned scalar operation, so that the software for generating the instruction ma be common to the scalar operation and the vector operation.

Figure 3:
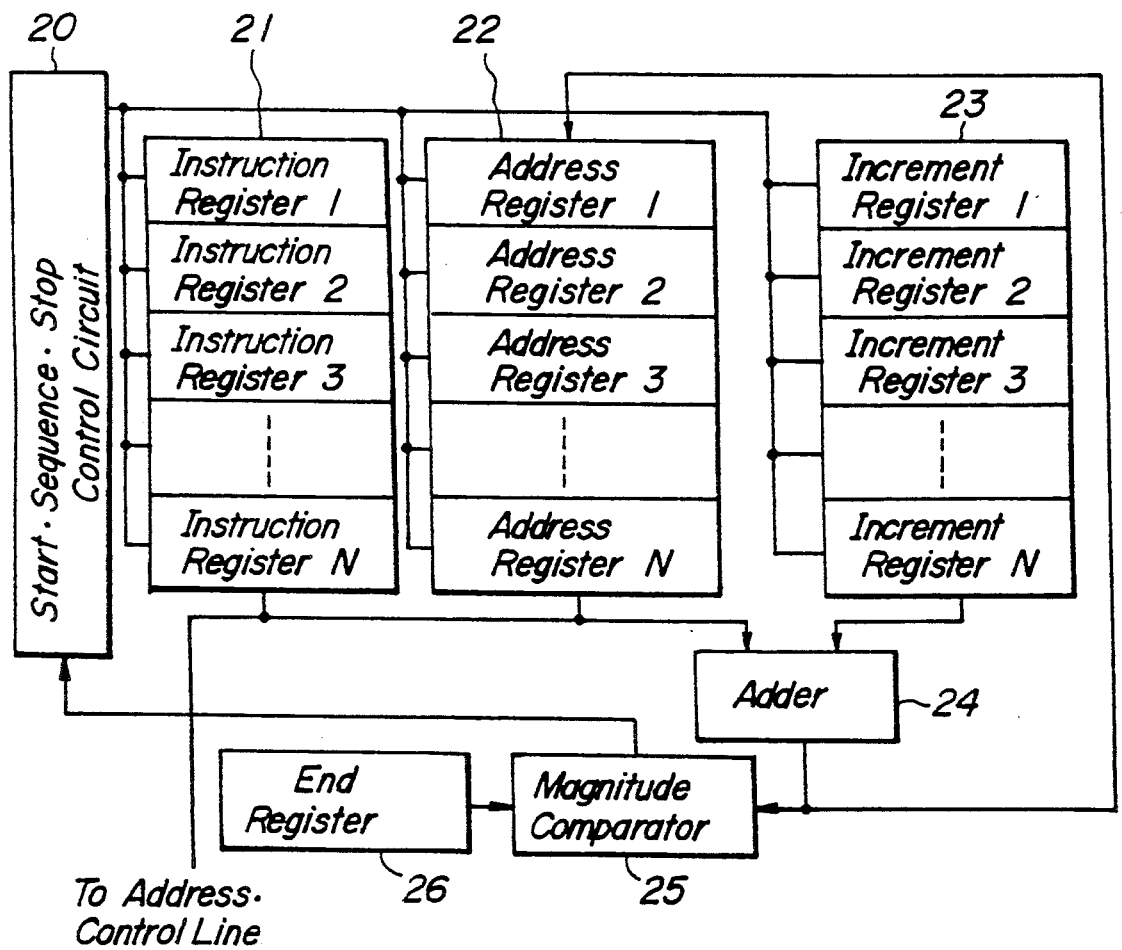
FIG. 3 is a block diagram depicting the construction of an embodiment of the control circuit.

FIG. 3 is a block diagram illustrating the construction of an embodiment of the control circuit 10. There is provided a start, sequence and stop circuit 20 for controlling the start, sequence and stop of the operation. To the control circuit 20 are connected an instruction register 21 composed of N instruction register stages, an address register 22 constituting of N address register stages and an increment register 23 composed of N increment register stages. The last stage of the address register 22 (address register stage N) and the last stage of the increment register 23 (increment register stage N) are connected to inputs of an adder 24, and an output of the adder 24 is connected to an input of a magnitude comparator 25 as well as to a first stage of the address register 22 (address register stage 1). The last address of the data to be operated is set in the end register 26, and an output of this end register is connected to the other input of the magnitude comparator 25.

Now the operation of this arithmetic system will be explained. At first, the initial setting for storing the address format will be effected under the control of CPU 1. Executive instructions for FPU are successively set into N stage address register 21, addresses of data stored in the memory 4 (front addresses of data arrays) are successively stored in the N stage address register 22, and the increment values of addresses are set in the increment register 23. In this initial setting operation, the setting of the instruction and address may be performed simultaneously in a manner similar to the above explained scalar operation. Next, the operation is started by accessing the start.sequence.stop control circuit 20. Under the control of a clock signal generated from a clock generator not shown, sequential operating instructions and sequential addresses are read out of the instruction register 21 and address register 22 into the address.control bus line, and in response thereto the data transfer between the memory and FPU and the operation at FPU are sequently carried out in the manner similar to that explained above. In the adder 24, the inputted address and an increment value are added to each other, and an added output is supplied to the first stage of the address register 22 and the content in the address register is subsequently altered. The output of the adder 24 is also supplied to the magnitude comparator 25 and is compared with the last address of the data to be operated and stored in the end register 26. An output from the magnitude comparator 25 is supplied to the control circuit and the operation process is completed. After the completion of the operation, the bus lines are connected to CPU 1 and another process is performed. It should be noted that the output of the address register may be generated at an earlier timing than the timing of the output from the instruction register 2 by taking into account of a necessary time for reading the data out of the memory 4. Moreover, in order to shorten the overhead time for the memory access, data to be operated next may be transferred to FPU 5 during the operation. Then, the executing time of the vector operation becomes equal to a sum of the initial setting time and a product of the number of vector elements and an operation time per one element. Since the operation time per single element can be made substantially equal to the faculty of FPU, the vector operation can be carried out at a very high speed which is higher than that for the scalar operation by about ten times.

Figure 4:
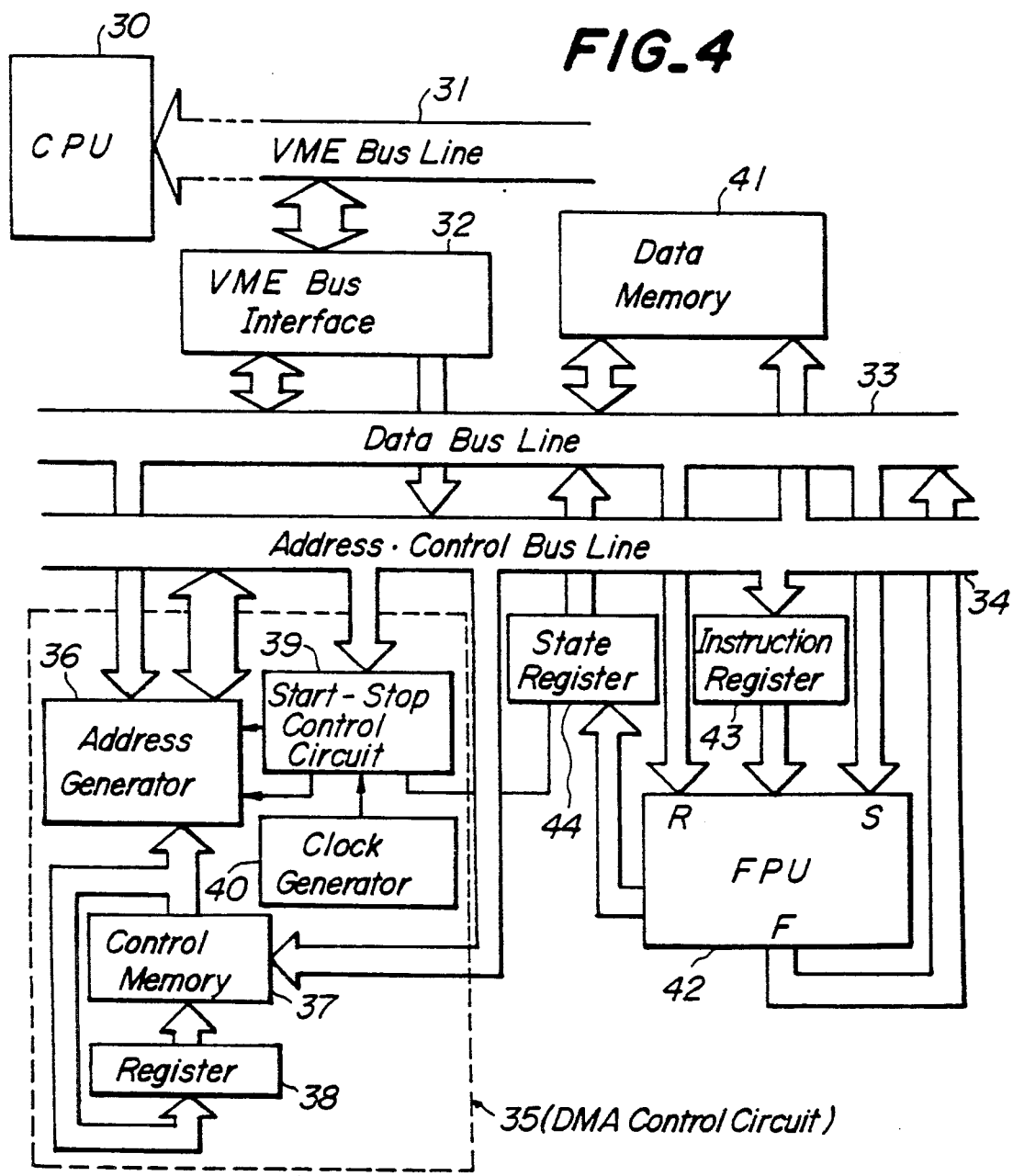
FIG. 4 is a block diagram showing the construction of FPU board on which the processor and its peripheral equipments are mounted.

FIG. 4 is a block diagram illustrating the concrete construction of commercially available CPU, FPU and other peripheral equipments. CPU 30 is formed by MC 68020 microprocessor manufactured by Motorola, and this processor is connected to VME bus interface 32 via VME bus line 31. The VME bus interface 32 serves to derive and control the transmission and reception of address, data and control signal. The VME bus interface 32 is connected to a data bus line 33 and an address-.control bus line 34 of 32 bits. There is further provided a DMA control circuit 35 (Direct Memory Access Controller) as the circuit for controlling the data transfer and executive instruction. The DMA control circuit 35 comprises address generator 36 (ADSP-1410), control memory 37, register 38, start.stop control circuit 39 and clock generator 40 for generating a clock signal of 6.144 MHz in case of the vector operation. A data memory 41 storing the data to be operated is connected to data bus line 33 and address bus line 34. The data memory 41 comprises SRAM of 128 K bytes and having an access time of 85 ns. FPU 42 for performing the floating point operation is constructed by a floating point operating processor AM 29325 manufactured by Advanced Microdevice Company. This processor AM 29325 can effect the floating point addition, subtraction and multiplication for 135 ns and includes R register and S register for latching the input data and F register for latching the result of operation. By using these registers, the summation of products can be conducted by two clocks. The executive instruction for FPU 42 is supplied from the DMA control circuit 35 via the address.control bus line 34 and instruction register 43. The data to be operated is read out of the data memory 41 into the data bus line 33 and is stored in the R register and S register, and the result of operation is supplied to the data bus line 33 from the F register. To FPU 42 is further connected a stage register 44 by means of which the operating condition in FPU can be known from CPU 30.

Figure 5:
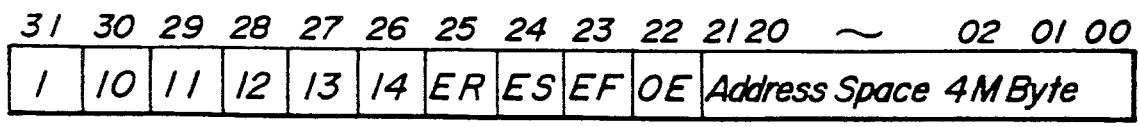
FIG. 5 is a schematic view representing the address format of the instruction signal.

The operating instruction and register control instruction for FPU 42 are loaded by means of the address.control bus line 34. FIG. 5 shows the address format of the present embodiment. In this embodiment, the mapping of the executive instruction for FPU is included in the address space. When the most significant bit A31 of the address code is 1, it is recognized that the instruction for FPU 42 is existent. Bits A30~A22 represent the executive instruction for FPU and bits A21-~A00 denote addresses of data to be operated. It should be noted that in case of A31=1, the data bus of the VME bus line 31 is interrupted.

In the present embodiment, the scalar operation is carried out under the control of CPU 30, and the vector operation is performed under the control of the DMA control circuit 35. The control for the vector operation includes ① repetition control,
② address calculation and
③ judgment of end.

The repetition control is effected in accordance with a micro instruction stored in the control memory 37, and the address calculation and judgment of end are performed by the address generator 36. Under the control of CPU 30, the initial address values, address increment values, last address values and the contents of operation to be effected in FPU are set in the address generator 36 by means of the address bus. In the control memory 37, there is set the micro instruction for controlling the address generator 36 during the operation. This micro instruction is set by way of the address bus line simultaneously with the setting of the initial address values. Then, the operation is initiated by effecting the access to the start.stop control circuit 39. The DMA control circuit 35 is controlled by the clock signal supplied from the clock generator 40, and the address generator generates at each clock the code signal including the executive operating instruction code for FPU 42 and the address code which represents the data to be operated and is generated for the data memory 41 in accordance with the micro instruction supplied from the control memory 37. The code signal thus generated is supplied to the data memory 41 and FPU 42 via the address.control bus line 34. The data memory sends the data to be operated to the register of FPU 42 in accordance with the entered code signal, and FPU 42 effects the operation for the entered data in accordance with the operation executive instruction. Then, the operation is completed when the last address code signal is supplied from the address generator 36.

What we claim is:

1. A floating point arithmetic system for performing a scalar operation comprising:

memory means for storing data to be operated upon and for reading data stored at an address position denoted by an address code;

a floating point operating processor for effecting a floating point operation;

processing means for generating an instruction signal including an instruction code representing an operation to be executed by said floating point operating processor and an address code representing the address of data to be operated upon;

a data bus line connected to said floating point operating processor, said memory means and said processing means for transferring data therebetween;

an address control bus line connected to said floating joint operating processor, said memory means and said processing means for transferring said instruction signal generated by said processing means;

a read-write control line connected to said floating point operating processor, said memory means and processing means for transferring a read-write control signal generated by said processing means to said floating point operating processor and said memory means, said read-write control signal serving to control said floating point operating processor and said memory means such that when said memory means is conditioned to read out data, said floating point operating processor writes the data read out from said memory means; and an instruction latch, connected to said address control bus line between said memory means and said floating point operating processor, for temporarily storing said instruction code contained in said instruction signal transmitted from said processing means via said address control bus line;

wherein data is read out of said memory means from an address denoted by said address code in the instruction signal and is transferred to said floating point operating processor and is written therein, and wherein the written data is operated on by said floating point operating processor in accordance with the instruction code contained in said instruction signal and stored in said instruction latch.

2. The system according to claim 1, wherein the generated instruction signal includes a flag of 1 bit for representing the existence of the instruction code, the instruction code of 9 bits and the address code of 22 bits.

3. The system according to claim 1, further comprising an inverter, connected to said read-write control line between said memory means and said floating point operating processor, for inverting the read-write control signal generated by said processing means.

4. A floating point arithmetic system for performing a vector operation comprising:

processing means for generating a read-write control signal and an instruction signal which includes an instruction code representing an operation to be executed and an address code representing an address of data to be operated upon;

memory means for storing data to be operated upon and for reading out data stored at an address position denoted by said address code in said instruction signal;

a floating point operating processor for performing a floating point operation upon the data read out of said memory means in accordance with said instruction code in said instruction signal;

a data bus line connected to said floating point operating processor, said memory means and said processing means for transferring data therebetween;

an address control bus line connected to said floating point operating processor, said memory means and said processing means for transferring said instruction signal generated by said processing means;

a read-write control line connected to said floating point operating processor, said memory means and processing means for transferring a read-write control signal generated by said processing device to said floating point operating processor and said memory means, said read-write control signal serving to control said floating point operating processor and said memory means such that when said memory means reads out data, said floating point operating processor writes the data read out from said memory means;

an instruction latch, connected to said address control bus line between said memory means and said floating point operating processor, for temporarily storing said instruction code contained in said instruction signal transmitted from said processing means via said address control bus line; and a control circuit connected to said data bus line, said address control bus line and said read-write control line between said processing means and said memory means, said control circuit comprising a plurality of instruction registers for storing a plurality of instruction codes to be executed successively, a plurality of address registers for storing a plurality of address codes of data to be operated upon successively, and a circuit for reading out said instruction codes and said address codes successively in synchronism with each other;

wherein data are successively read out from said memory means in accordance with the successively read out address codes, are transferred to said floating point operating processor via said data bus and are written therein, and the written data are successively operated by the floating point operating processor in accordance with the successively read out instruction codes stored in said instruction latch.

5. The system according to claim 4, wherein the generated instruction signal includes a flag of 1 bit for representing the existence of the instruction code, the instruction code of 9 bits and the address code of 22 bits.

6. The system according to claim 4, further comprising an inverter, connected to said read-write control line between said memory means and said floating point operating processor, for inverting the read-write control signal generated by said processing means.

* * * * *